United States Patent [19]
Lee et al.

[11] Patent Number: 5,600,749
[45] Date of Patent: Feb. 4, 1997

[54] DEVICE WITH DIFFERENTIALLY DEFORMABLE HOUSING FOR CONNECTION OF OPTICAL ELEMENTS

[75] Inventors: Nicholas A. Lee, Woodbury; Jack P. Blomgren, Red Wing; Gordon D. Henson, Lake Elmo; Michael A. Meis, Maplewood, all of Minn.

[73] Assignee: Minnesota Mining and Manufacturing Co., St. Paul, Minn.

[21] Appl. No.: 519,391

[22] Filed: Aug. 25, 1995

[51] Int. Cl.[6] ................................... G02B 6/38
[52] U.S. Cl. ............................... 385/70; 385/72
[58] Field of Search .................. 385/53, 55, 56, 385/70–72, 76, 77, 95, 98, 99, 65, 83

[56] References Cited

U.S. PATENT DOCUMENTS

| 4,123,138 | 10/1978 | Morrison | 385/70 |
|---|---|---|---|
| 4,470,180 | 9/1984 | Blomgren | 24/563 |
| 4,729,619 | 3/1988 | Blomgren | 385/70 |
| 4,781,430 | 11/1988 | Tanaka | 385/77 |
| 4,818,055 | 4/1989 | Patterson | 385/98 |
| 4,865,412 | 9/1989 | Patterson | 385/71 |
| 5,078,467 | 1/1992 | Blomgren et al. | 385/56 |
| 5,102,212 | 4/1992 | Patterson | 385/98 |

*Primary Examiner*—John D. Lee
*Attorney, Agent, or Firm*—Gary L. Griswold; Walter N. Krin; H. Sanders Gwin, Jr.

[57] ABSTRACT

A connector for coaxial interconnection of optical fibers includes an elastically deformable housing having regions with differing geometries and elastic properties. The geometries and elastic properties in the housing regions are adapted to retain against a channeled mount optical fiber components with widely varying diameters and a wide range of tolerances.

31 Claims, 4 Drawing Sheets

DEVICE WITH DIFFERENTIALLY DEFORMABLE HOUSING FOR CONNECTION OF OPTICAL ELEMENTS

BACKGROUND OF THE INVENTION

1. Field of the Invention

The present invention concerns connectors that retain optical elements in axial abutting relation. More particularly, the present invention relates to a connector for buffered optical fibers which includes an elastically deformable, generally tubular housing adapted to receive a rigid mount having a generally elliptical cross-section. The housing has regions with specific geometries and elastic properties adapted to retain particular fiber components, e.g., a bare fiber terminal end or a buffer, against a channel in the elliptical mount. The varied geometries and elastic properties of the regions allow each region to open a predetermined distance when elastically deformed and to exert a predetermined level of compressive force against the mount when attempting to return to its undeformed state. The differential interaction between the regions of the housing and the mount allows highly precise insertion, alignment and retention of the bare fibers while, at the same time, allowing simple insertion, alignment and retention of the much larger and more diametrically-varied fiber buffers with an adequate but less exacting degree of precision.

2. Description of Related Art

Optical elements, such as optical fibers, laser diodes and other light sources, polarizers, lenses, beam splitters and the like, are presently in wide use, particularly for high speed communication and data transmission. Connectors may be used to non-permanently connect, disconnect and reconnect the optical elements incorporated into an optical communication network, while splices may be used to permanently connect the network elements. The present application is directed to connectors, which may be easily coupled and uncoupled to allow multiple, non-permanent connection and reconnection of optical elements.

Many such connector designs are in present use. However, regardless of the design selected for a particular application, alignment of the terminal ends of the connected optical elements is critical to maintain the signal strength as the light passes through the connection. To connect standard telecommunications grade optical elements, such as optical fibers, the fibers must be supported and oriented both longitudinally and transversely to minimize attenuation of the light signal passing through the fiber connection. As is well known in the art, this is accomplished by optimizing fiber positioning to ensure minimum transverse, longitudinal and angular offset between the fiber cores.

An optical fiber connector described in FIG. 4 of U.S. Pat. No. 4,470,180 to Blomgren shows a resiliently deformable housing 35 including first and second interior wall portions 36–37. An internal member 38 with an undercut 52 is positioned in the passageway proximate the first interior wall portion 36. If the housing is in a relatively undeformed state, an optical fiber 40 may be supported between the undercut portion 52 and the housing 35 and held firmly in position. If compressive force is applied to deform the housing as indicated by arrows 41, a second optical fiber or an optical device can be inserted to become coaxially interconnected with the first, or the first fiber may be easily removed from the connector.

In FIG. 1 of U.S. Pat. No. 4,729,619 to Blomgren, the deformable housing 16 contains a mandrel 24 with an alignment groove 26 having a substantially V-shaped profile to support the bare fibers 12, 14 to be connected. Rigid chocks 20, 22 with reception grooves 34, 36 are adapted to releasably secure the buffer coatings 38–39 of the fibers when inserted into deformable housing 16. When the housing 16 is in a relatively undeformed state, the bare optical fibers are urged into contact with the alignment groove 26 in the mandrel and held firmly in position between the mandrel 24 and the housing 16. The buffers of the optical fibers are urged into contact with the reception grooves 34, 36 of the chocks 20, 22 and held firmly in position between the chocks and the housing. If compressive force is applied to deform the housing, a second optical fiber or optical device may be inserted into the connector to axially interconnect with the first, or the first fiber may be easily removed from the connector.

The connectors described in the '180 and '619 patents require use of a small, pliers-like tool to deform the housing for insertion and/or removal of the optical fibers from the mount.

The connector in U.S. Pat. No. 5,078,467 to Blomgren may include a three-piece mandrel 21 consisting of a central ceramic portion 22 designed to retain the coaxially abutting bare optical fibers and a pair of resinous strain relief chocks 24 designed to retain the optical fiber buffers (See FIG. 2). In an alternate embodiment, the mandrel 31 is a one piece structure with a central shallow groove 33 to retain the abutting optical bare fibers and deeper outer troughs 35 to retain the buffers (see FIG. 3; see also EP 0 438 898). The mandrel is surrounded by an envelope 27 which incorporates a pair of normally parallel flanges 28 centrally divided into a pair of levers 28A. The housing may be integrally molded to the levers or may be a tubular structure emplaced between the lever arms. When the opposed levers are squeezed together, the housing is deformed and an optical fiber or optical device may be received or removed at the end of the connector.

Bare optical fibers, which typically have a diameter of 125 µm±1 µm, are much smaller and manufactured to much closer tolerances than their buffers, which have a diameter of about 250 µm±15 µm to 900 µm±50 µm. The bare fibers must be aligned with a considerably higher degree of precision than the buffers, and must be retained against the mount with considerable force. These requirements were addressed in the Blomgren patents by concentrating on the properties of the mount-forming the mount for the bare fibers and the chock for the buffers from different pieces with separate material properties (see col. 2, lines 28–35 of the '467 patent). While generally effective, this approach requires use of many different pieces to make a single connection between optical fibers and/or optical elements. Forming a connection between fibers requires aligning the bare fibers in the grooved mandrel, and then inserting the chocks around the fiber buffers.

To ensure that precise connection of two optical fibers has, in fact, been made, the assembler would prefer to feel the bare fibers slide inward along the mount channel and abut one another. This precision "feel" is difficult to achieve with the multi-piece connectors described above, since the bare fibers must remain in place in the mount channel while the chocks are inserted into the housing to retain the buffers. The increased friction created as the large diameter buffers slide along the mount channel also masks the feel of the connector, and it may be difficult for the assembler to determine when a firm connection is made. The friction created during buffer alignment and lack of connector feel also may cause bending and/or breakage of the bare fibers.

Large variations in manufacturing tolerances between the bare fibers and the buffers, as well as the significant differences in the required degree of interconnection precision between them, are difficult to accommodate in a single tubular housing structure. When deformed, such a housing must have a geometry and elastic properties which allow insertion of the bare fibers and buffers into the mount channel and movement within the channel of the bare fibers into axial abutting relation. However, the housing must not deform to such a large extent that the bare fibers slip outside the channel during the insertion procedure. Further, the undeformed housing must have geometry and elastic properties to retain all components against the channel. A single housing material and structure which will satisfactorily perform each of these insertion, alignment and retention functions has not yet been identified.

SUMMARY OF THE INVENTION

The present invention improves on the connectors described above by providing a housing surrounding the mount which has distinct regions. Each region of the housing has a geometry and elastic properties adapted to open a predetermined distance when elastically deformed to permit insertion or removal of an optical fiber component into or from the connector. When returning to an undeformed state, each region is adapted to retain with a predetermined level of compressive force an optical fiber component against a channel in the mount.

In an embodiment adapted to releasably connect optical fiber cables, the housing structure of the invention has a first region adapted to retain a bare optical fiber against the mount, and a second region adapted to retain an optical fiber buffer against the mount. When the first region is elastically deformed, it opens and moves a predetermined distance away from the mount to allow an assembler to insert (or remove) the bare terminal ends of a pair of optical fibers in a mount channel. The bare ends may then slide along the channel until their ends are axially aligned in abutting relation in the channel. When the deformation force is removed and the first region attempts to return to its undeformed state, the first region exerts an appropriate level of compressive force to clamp the bare fibers in the mount channel and securely retain them there. When the second region is elastically deformed, it opens and moves a predetermined distance away from the inserted mount to allow an assembler to insert (or remove) the buffers of the optical fibers in the mount channel. When the deformation force is removed, the second region attempts to return to its undeformed state and exerts an appropriate level of compressive force to clamp the buffers in the mount channel and securely retain them.

The connector of the invention further includes means for applying a compressive force to selectively deform the first and second regions of the housing.

The geometry of the first and second regions, as well as the elastic properties of the materials from which the first and second regions are made, allow independent control of the amount of elastic deformation of each region when a predetermined level of compressive deformation force is applied to the housing. For example, the first and second regions may be constructed such that an applied compressive deformation force will cause the second region to open rapidly and widely to accept/retain the fiber buffers, while the first region opens relatively less widely to accept/retain the bare fiber ends. This differential opening process allows the first and second regions of the housing to move differing distances away from the mount to enable an assembler to insert the bare fibers and buffers, respectively, into the mount channel and slidably move them within the channel until the bare fibers abut one another. However, the first region of the housing must not move away from the mount to such a large extent that the bare fibers slip outside the channel during the insertion procedure. When the deformation force is removed, the first and second regions attempt to return to an undeformed state, and the varied geometry and elastic properties of each region allow independent control of the compressive retention force exerted on the fiber buffers and the bare fiber ends by each region. This separation of buffer alignment and fiber end alignment functions provides greater ease of insertion, lower insertion loss, greater resistance to tensile pull out, and lower bending losses than conventional connector designs.

In another embodiment adapted to releasably connect optical fiber cables, the invention includes a connector body with a housing adapted to receive a mount having a generally elliptical cross-section and a longitudinal surface channel. The housing includes first and second opposed tubular sections made of a first material with a first geometry (i.e., diameter and wall thickness) and specified elastic properties. When a compressive deformation force is applied to the housing, the first and second tubular sections, which have a generally circular cross-section in the undeformed state, elastically deform, ovalize, and move away from the mount to permit insertion of the fiber buffers in the mount channel. When the deformation force is removed, the first and second tubular sections attempt to return to their original, undeformed shape and produce a compressive force which clamps the buffers against the mount channel. The first and second tubular sections may be constructed from any material with suitable elastic properties to open sufficiently when deformed to permit insertion of the fiber buffers into the connector, and, when undeformed, to apply sufficient compressive force to retain the fiber buffers against the mount.

A central tubular section with a generally circular cross-section is positioned in the connector body between the first and second tubular sections. The central tubular section is made of a second material with a second geometry and elastic properties different from that of the first and second tubular sections. When a compressive deformation force is applied to the central tubular section, the central section elastically deforms, ovalizes, and moves away from the mount to permit insertion of the bare optical fibers into the mount channel in axially abutting relation. When the deformation force is removed, the central tubular section attempts to return to its original, undeformed shape and produce a compressive force which clamps the bare fiber ends against the mount channel. The central tubular section may be constructed from any material with suitable elastic properties to open sufficiently when deformed to permit insertion of the bare fiber ends into the connector, and, when undeformed, apply sufficient compressive force to retain the bare fibers against the mount, although metal tubes are generally preferred.

The mount has a generally elliptical cross-section and includes a surface with at least one shallow longitudinal groove to retain the abutting bare fibers inserted into the connector. In a preferred embodiment, the mount includes a central shallow groove adapted to receive and retain the bare fibers. At the extremities of the shallow portion of the groove lie opposed deeply grooved portions adapted to receive and retain the buffers. If a mount with a shallow groove and opposed deeper grooves is used, the housing is configured such that when the mount is inserted in the housing the central tubular section of the housing overlies the shallow portion of the groove and the opposed first/second regions of the housing overlie the opposed more deeply grooved portions.

The present invention may include any suitable means for selectively deforming the first and second deformable regions of the housing region of the connector body. In one embodiment, the means for deforming include levers integrally molded into the connector body which act on the first and second deformable regions of the housing. The means for deforming may also include appropriately designed tools.

DETAILED DESCRIPTION OF THE PREFERRED EMBODIMENTS

The present invention provides an inexpensive, reusable mechanical device for connecting one optical element, for example, an optical fiber, to another. As is well known in the art, fiber optic cables generally consist of an optical fiber, a buffer layer around the fiber, and various strength members around the buffer layer (see, for example, Sterling, *Technician's Guide to Fiber Optics*, (1993) at page 73). In the present application, the term "bare fiber" or "fiber end" refers to the portion of the fiber optic cable from which the buffer and external strength members have been removed. If a non-strippable protective layer lies beneath the buffer, the protective layer is considered part of the bare fiber. In this application, the term "buffer" refers to any coating layer applied to the optical fiber or bare fiber, but does not include the strength members or the jacket which make up the outer layer of the cable. The strength members and jacket are normally removed at the point where the cable is inserted into a connector.

Figure 1A:
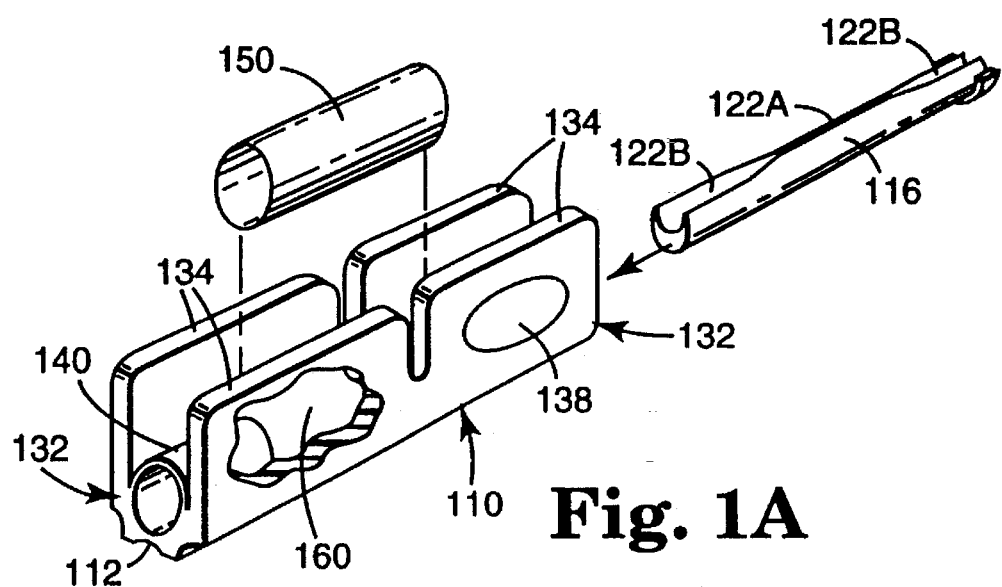
FIG. 1A is a perspective view, partially cut away, of an embodiment of the invention having a mount with a removable central tube section.
Figure 1B:
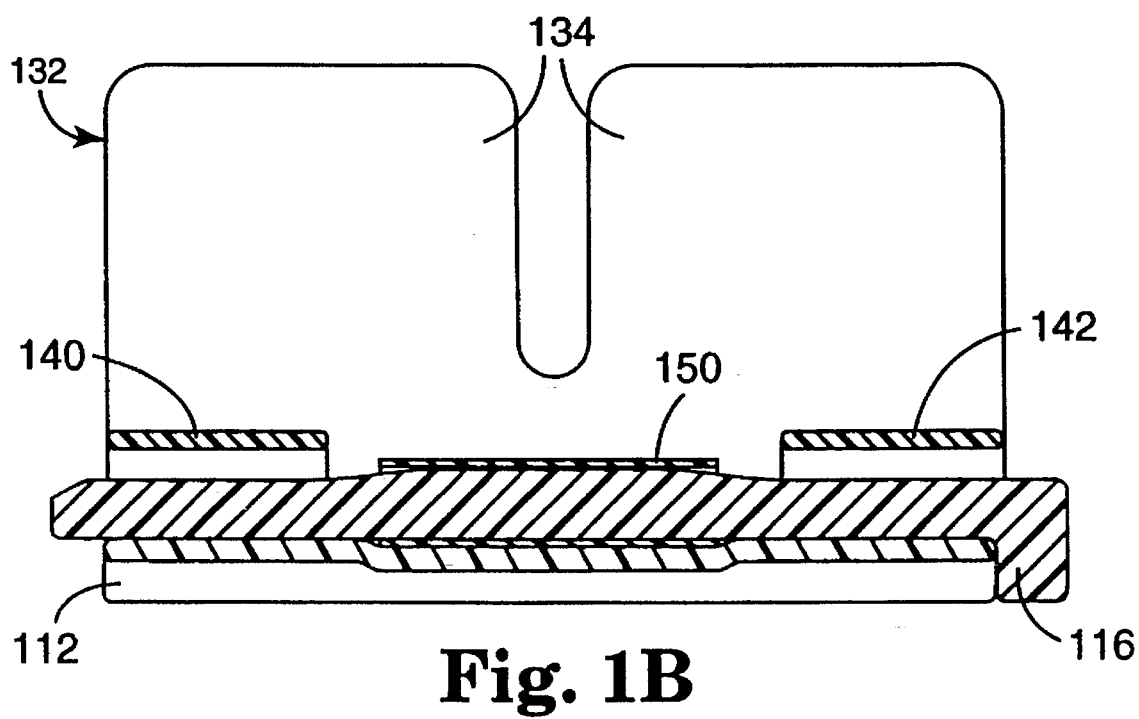
FIG. 1B is a longitudinal cross-section through the embodiment of FIG. 1A with inserted central tube section.

An embodiment of the connector of the invention shown in FIGS. 1A and 1B includes a connector body 110 with a housing adapted to receive a mount 116. The housing is comprised of a first elastically deformable tube section 140, a separate second elastically deformable tube section 142, and an elastically deformable central tube section 150 which is removable from the connector body. Each of the tube sections 140, 142, and 150 making up the housing has a substantially circular cross-section when undeformed.

The first deformable tube section 140 is integrally formed on an upper surface of a base 112 of the connector body and is positioned adjacent a first end thereof. The second deformable tube section 142, separate from and generally axially aligned with the first deformable tube section 140, is integrally formed on the upper surface of the base 112 and adjacent a second end thereof.

The generally cylindrical central tube section 150 may be inserted into and interference retained in a cavity 160 in the connector body 110, snapped into the cavity 160, or retained in the cavity 160 with appropriately placed projections (not shown). The central tube section 150 may be generally axially aligned with the first and second tube sections 140, 142. In the alternative, to compensate for the large variation between buffer and bare fiber diameters and reduce fiber stresses and bending losses, the central tube section 150 may be offset between the first and second tube sections 140, 142.

Opposed lateral pairs of flanges 132 attach to the base 112, contact the first and second deformable tube sections 140, 142 generally at their diameters, and extend upward generally perpendicular to a plane of the base. The flanges 132 may each be centrally divided into a pair of levers 134 with depressions 138 to engage an assembler's fingers.

The mount 116 has a substantially elliptical cross-section with a major axis selected to provide an interference fit in the tubular sections 140, 142, and 150 making up the housing. When the housing is undeformed, the mount 116 is retained by hoop stress in the tubular sections 140, 142, and 150. The mount 116 is preferably made of a ceramic material, and includes a longitudinal V-groove on its surface with a shallow central portion 122A and opposed deeper portions 122B. The angle of the V-groove may vary widely depending on the optical fiber components to be retained, but is generally in a range of about 60° to 80°, preferably about 70°. The depth of the V-groove may also vary widely depending on the intended application. For example, to retain a typical 125 micron bare fiber, the central portion 122A should be sufficiently deep such that a 125 μm gauge pin placed longitudinally in the groove will protrude above the top surface of the mount by about 0.001 to 0.001 inches (0.0015 to 0.0051 cm). The depth of the deep portions 122B of the groove should likewise be selected so a fiber buffer placed longitudinally in the groove will protrude above the top surface of the mount by about 0.001 to 0.001 inches (0.0015 to 0.0051 cm).

As shown in FIG. 1, the central tube section 150 is retained within the connector body 110 and between the opposed pairs of flanges 132. If the mount 116 is inserted into the tube sections 140, 142, and 150 making up the housing, the shallow central portion 122A of the mount groove resides within the central tubular section 150, and the opposed deeply grooved portions of the mount channel 122B reside within the first and second deformable tube sections 140, 142.

Figure 2C:
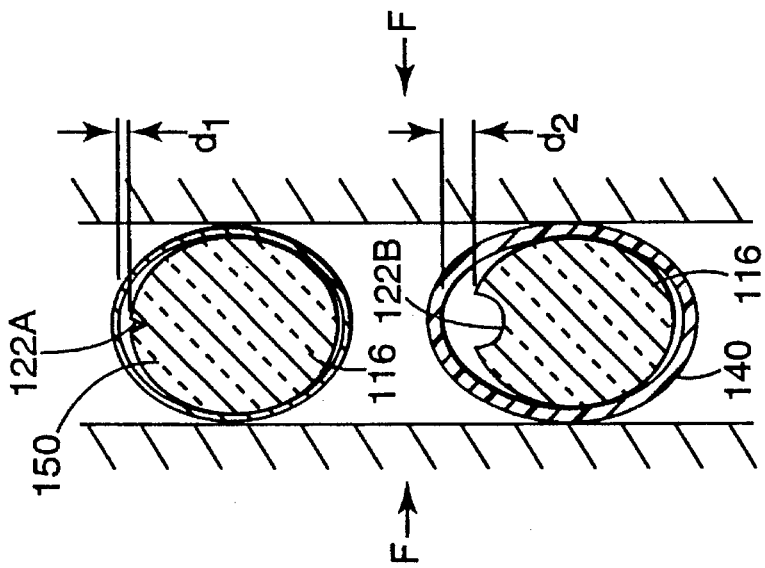
FIG. 2C is the diagrammatic cross-sectional view of FIG. 2B following application of additional compressive deformation force to the housing.
Figure 2B:
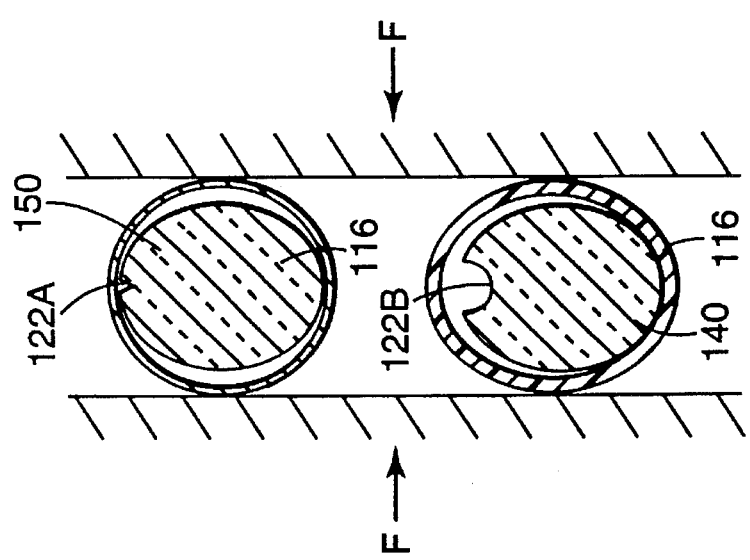
FIG. 2B is the diagrammatic cross-sectional view of FIG. 2A, which illustrates the initial application of a compressive deformation force to the housing.
Figure 2A:
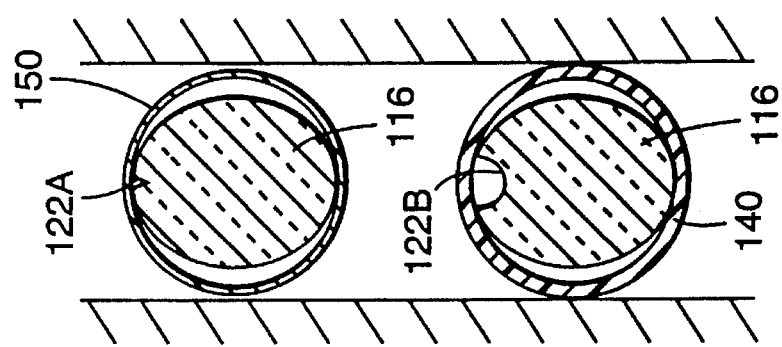
FIG. 2A is a diagrammatic cross-sectional view of an undeformed first tube section and an undeformed central tube section of the embodiment of the invention illustrated in FIG. 1.

Referring to the diagrammatic cross-sectional view in FIG. 2A, when no compressive force is applied to the housing and the housing is undeformed, a generally triangular region is created between the shallow portion 122A of the mount groove and an inner surface of the central tube section 150. A semi-circular region is created between the deep portion 122B of the mount groove and an inner surface of the first tube section 140 (or the second tube section 142, which for the purpose of clarity is not shown in FIG. 2). When the housing members are undeformed, the cross-sectional area of the triangular region is too small to allow insertion into the connector of a bare optical fiber, and the cross-sectional area of the semi-circular region is too small to allow insertion into the connector of an optical fiber buffer.

As shown in FIG. 2B, if a compressive force F is exerted on the housing along a minor axis of the mount 116 by, for example, squeezing together the levers 134 (not shown for clarity), the applied compressive force initially begins to elastically deform and ovalize the tube section 140. The cavity 160 in the connector body may be made somewhat larger in diameter than the tube section 150, so the applied compressive force will act on the first and second tube sections 140 immediately, but will not contact the central tube section 150. The hoop stress in tube section 140 is overcome by the application of the compressive force, and the inside surface of the tube section 140 then moves upward and away from the deeper portions 122B of the V-groove in the mount 116. The semi-circular region over the deeper portions 122B of the V-groove then enlarges.

As illustrated in FIG. 2C, continued application to the levers 134 of the compressive force F begins to deform and ovalize the central tube section 150 of the housing. The hoop stress in the central tube section 150 is overcome, and the inside surface of the central tube section rises and moves away a distance $d_1$ from the shallow grooved portions 122A of the mount. The upward movement of the central tube section 150 enlarges the triangular region over the shallow portions 122A of the mount, and the triangular region ultimately becomes large enough to permit insertion of a bare fiber into (or removal from) the shallow portion 122A of the V-groove. At the same time, the inside surface of the first tube section 140 continues to rise and moves a distance $d_2$ away from the deeply grooved portions 122B of the mount. The enlargement of the semi-circular region continues and ultimately becomes large enough to permit insertion of an optical fiber buffer into (or removal from) the deep portions 122B of the V-groove.

The diameters and wall thicknesses of the tube sections 140, 142, and 150, as well as the elastic properties of the material from which they are constructed, allow the tube sections 140, 142 to ovalize and move away from the mount 116 a considerably greater distance ($d_2$) than the movement away from the mount 116 by the central tube section 150 ($d_1$). Therefore, the semi-circular region over the deeply grooved portions of the mount 122B enlarges rapidly to release or permit insertion of the larger and less diametrically precise buffers into the connector. The first and second tube sections 140, 142 generally deflect about 0.0045 to 0.005 inches (0.011 to 0.013 cm) on each side across the minor axis of the mount 116. The triangular region over the shallowly grooved portions of the mount enlarges more slowly to release or permit insertion of the small, diametrically-precise, bare fiber ends. However, the movement of the central tube section 150 away from the mount 116 is not so great, generally less than about 0.004 inches (0.010 cm) on each side of the central tube section 150 across the minor axis of the mount 116, that inserted bare fibers can slip past one another and overlap in the central portion 122A of the mount groove. Thus, the bare fiber ends and the buffers may slide along the V-groove in the mount to a preselected position in which the bare fibers lie in axially-abutting relation.

When the bare fibers and buffers have been inserted and brought to a preselected position in the shallow portions 122A and deep portions 122B, respectively, of the mount, the compressive force on the housing may be gradually removed by, for example, releasing pressure on the opposed levers 134. Since the central tube section 150 and the first and second tube sections 140, 142 were initially elastically deformed by the compressive forces exerted by the levers 134, the hoop stress in each section causes them to deovalize and attempt to return to their original, undeformed, circular cross-sectional shape. When the compressive force is gradually removed, central tube section 150 deovalizes immediately, and the tube sections 140, 142 deovalize at a somewhat later time.

Figure 3:
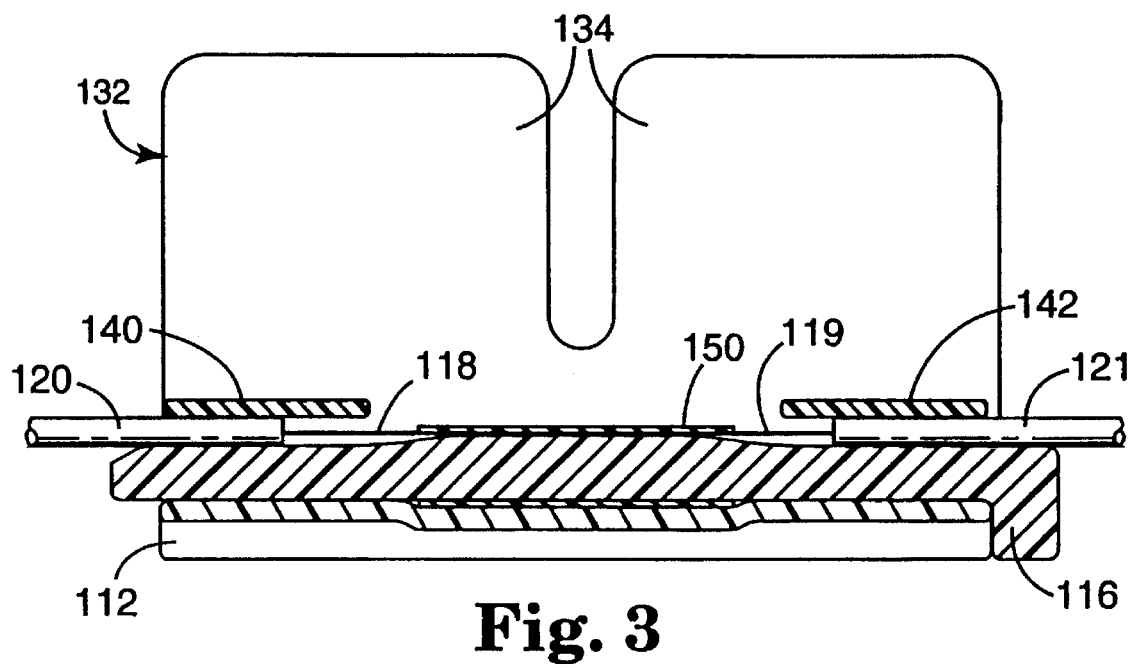
FIG. 3 is a longitudinal cross-section through the embodiment of FIG. 1A showing interconnected optical fibers and an undeformed housing structure.

As shown in FIG. 3, the inside surfaces of the central tube section 150 encounter a pair of protruding, axially abutted bare fibers 118, 119 and compressive forces clamp the bare fibers securely into the shallow central portion 122A of the V-groove. The inside surface of the first and second tube sections 140, 142 encounter a pair of protruding fiber buffers 120, 121 and clamp them into position in the deep portions 122B of the mount groove.

As noted above, axially aligning the bare fibers and retaining them in axial abutting relation requires significantly more precision and compressive force than the retention of the optical fiber buffers. The separable central tube section allows selection of a different geometry and/or material for fiber or buffer retention functions, respectively, to be performed, such that differential displacements may be obtained between the mount and the central tube section 150 and the first/second tube sections 140, 142. The separable central tube section also simplifies the mold design and the filling of the mold cavity with polymer during the manufacture of the levered connector body.

For example, the central tube section 150 is preferably made of a material with specific elastic properties. The material selected must deform to allow insertion of the bare fibers, and then return precisely to its undeformed state to clamp the bare fibers in place against the mount channel. To provide the differential opening described above, the material selected for the central tube section should also be generally more resistant to deformation than the portions of the connector used to retain the buffers. These desired force application and deformation properties must be maintained over extended periods of time and must not vary with temperature. A metallic material is generally preferred for the central tube section 150. A precision-drawn, low thermal expansion metal alloy tube offers superior surface smoothness, straightness, and extended temperature range stability compared to other tube materials. These characteristics diminish fiber light loss caused by mismatches in the coefficient of thermal expansion between connector components.

Typical metal alloys used for the central tube section may vary widely depending on the intended application, but metals normally selected for use in springs are preferred, such as stainless steels, nickel alloys, tin-copper alloys (brass), and beryllium copper alloys. Beryllium copper alloy is preferred, most preferably BeCu alloy #25, Full Hard. The low thermal expansion of BeCu alloy reduces signal loss variation in the connector over a typical temperature range of −40° C. to +80° C. using a temperature cycling profile as described in Bellcore document "Generic Requirements for Single-Mode Optical Fiber Connectors," GR-326-CORE, Issue 1, December 1994. The BeCu alloy also may be fabricated with extreme precision, which provides a connector with lower average insertion loss, improved resistance to tensile pull out and lower bending losses than housing materials used in conventional connectors. Generally, a BeCu alloy tube with an inside diameter of about 0.1277 inches (0.324 cm) and a wall thickness of about 0.005 inches (0.013 cm) is preferred to exert sufficient compressive force to retain bare fibers with a diameter of 125 μm against the mount channel.

In contrast, the first and second tube sections, which simply retain the buffers in general alignment with the bare fibers and control bending forces applied to the bare fibers, may be constructed of an inexpensive material with less precise elastic properties, such as a polymer. The polymer selected may vary widely depending on the intended application, but any polymer which has sufficient elastic properties to retain the buffers against the mount may be used. For example, as explained in U.S. Pat. No. 5,078,467 to Blomgren et al., polyetherimide resin (PEI) is suitable, as are polyethersulfone (PES) and polyarylsulfone (PAS). To exert sufficient compressive force to retain a typical 250 μm diameter buffer against the mount channel, first and second tube sections of PES with a diameter of about 0.1280 inches (0.325 cm) and a wall thickness of about 0.016 inches (0.041 cm) are preferred.

Figure 4:
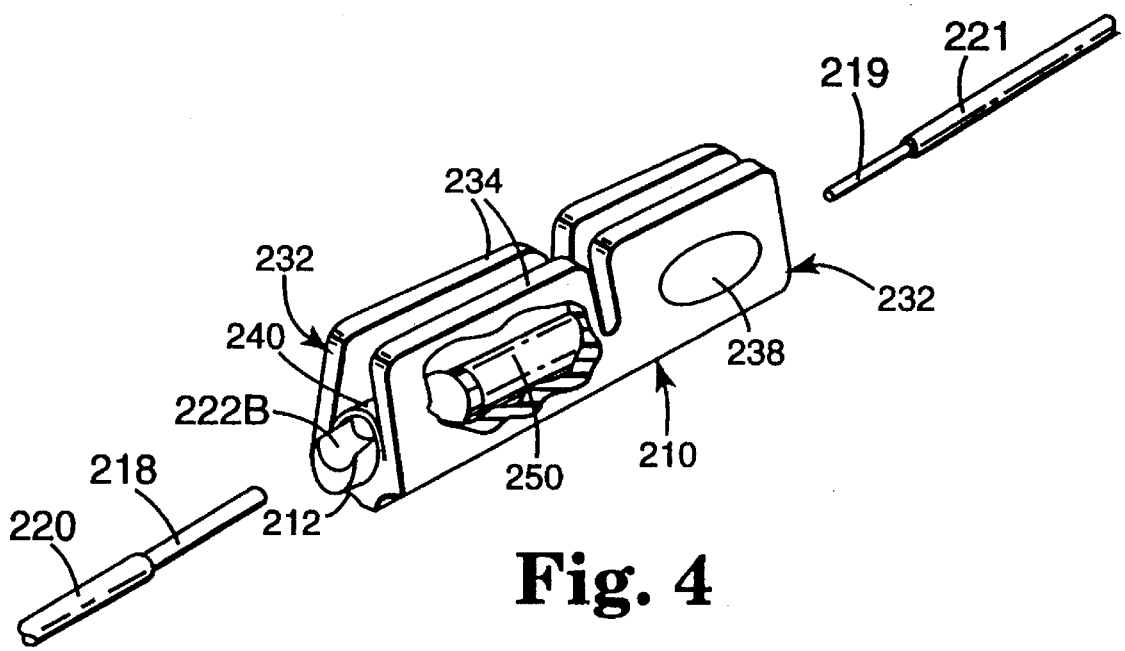
FIG. 4 is a perspective view, partially cut away, of an embodiment of the invention with an elastically deformed housing and an inserted mount.

In operation, as shown in FIG. 4, the connector of the invention may be used as follows to connect two buffered optical fibers. Initially, central tube section 250 is inserted in the connector body 110 between opposed pairs of flanges 232 and into alignment with first and second tube sections 240, 242 (not shown). Mount 216 is then inserted into and interference retained in the housing formed by the first and second tube sections 240, 242 and the central tube section 250 with the wide portions 222B of its longitudinal groove underlying the first and second tube sections and the narrow portion 222A (not shown) of the groove underlying the central tube section. When assembled in this way the connector is ready to receive optical fibers for interconnection.

To insert an optical fiber into the connector, the terminal ends of the two fibers to be connected are mechanically or chemically stripped. As illustrated in FIG. 4, the bare fibers 218, 219 thus created are then cleaved to a length appropriate for the narrow portion 222A of the groove. The opposed levers 234 are squeezed together with the fingers, which immediately exerts compressive forces against the deformable first and second tube sections 240, 242. Further deflection of the levers will cause contact with and initial deformation of the central tube section 250 while deformation of the first and second tube sections 240, 242 continues.

The central tube section 250 moves away from the mount 216 a distance sufficient to allow insertion of the bare fibers, 218 or 219, into the narrow portions of the groove 222A between the inner surface of the central tube section 250 and the mount 216. The first and second tube sections 240, 242 move away from the mount 216 much greater distance than the central tube section 250, and move upward in an amount sufficient to allow insertion of the buffers 220 or 221 between the inner surfaces of the first and second tube sections 240, 242 and the deeper portions 122B of the mount groove. The bare fibers 218 or 219 are then moved along the groove in the mount until the cleaved fiber ends rest in the appropriate position in the shallow portion 222A of the groove. Another optical fiber may be inserted into the opposed end of the connector in the same manner, until the bare fibers are positioned together in an axial abutting relationship. The separation of fine bare fiber alignment and course buffer alignment makes it possible for the assembler to determine when the bare fibers abut one another, so the connector of the invention thus provides secure connection "feel."

Figure 5:
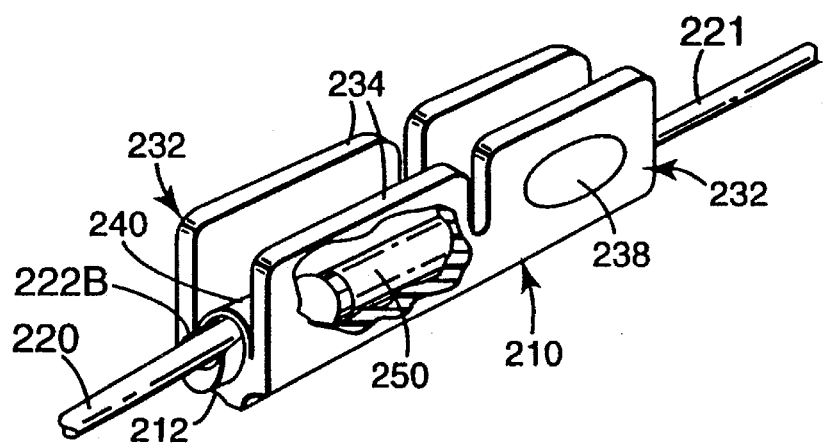
FIG. 5 is a perspective view, partially cut away, of an embodiment of the invention having an undeformed housing with an inserted mount and interconnected optical fibers.

Then, as shown in FIG. 5, the pressure on the levers 234 is released, the connector body 210 and the central tube section 250 attempt to return to their original shape, and the optical bare fibers and buffers are firmly clamped between the mount channel and the inner surface of the central tube section 250 or the inner surfaces of the first and second tube sections 240, 242, respectively, to form an optical interconnection. The connector may subsequently be re-deformed to remove one or both of the optical fibers as desired.

The connector of the invention is reusable, but, if the application demands, a curable resin or adhesive may be used to bond the bare fibers together permanently. Other materials, such as the index-matching materials described in U.S. Pat. No. 4,729,619, or detuning materials discussed in EP 0 438 898, may be used to customize the interconnection of the bare fibers. If desired, the groove in the mount may also be configured with a discontinuity to position the fibers slightly out of perfect axial alignment.

While the above discussion has illustrated the connector of the invention as used to connect and retain two optical fibers in a secure abutting relationship, the connector body, housing and/or the mount may be configured to releasably engage any optical element and align it with an optical fiber inserted in the opposite end of the connector. When the connector body is deformed, the optical element may be inserted into and/or removed from the connector.

In another embodiment of the invention not illustrated here, the housing may be a unitary tubular structure which is placed in a levered tool member or insert molded into a levered tool member to form a one-piece connector body. If the housing is a unitary structure, the first and second tube sections and central tube sections may be formed of different materials having differing elastic properties which are joined together. In the alternative, the unitary housing may be formed from a single material selected for its elastic properties. In such a case, the diameters and wall thicknesses of different regions of the tube are engineered to: (1) provide differing levels of deflection from the mount appropriate to allow insertion of the buffers and bare fibers, respectively, between the housing and the mount; and (2) exert differing amounts of compressive force against the mount appropriate to retain the buffers and bare fibers, respectively, against the mount channel. Transition regions between the regions are required to maintain the distinct elastic properties of each respective portion of the housing.

The mount of the present invention may also have many different configurations depending on the intended application and the shape or structure of the components to be retained by the connector. For example, U.S. Pat. No. 5,078,467 to Blomgren illustrates a three-piece mount consisting of a central ceramic portion of generally elliptical cross-section with longitudinal grooves designed to retain the coaxially abutting bare optical bare fibers and a pair of cooperative polymeric, e.g., polycarbonate, strain relief chocks having generally elliptical cross-section and longitudinal grooves designed to retain the optical fiber buffers (see FIG. 2 of the '467 patent). For example, the strain relief chocks may be interference retained within the housing structure of the connector body, or may snap-fit into locking details in the housing or in the ceramic portion of the mount.

The present invention will be further described with reference to the following non-limiting example.

EXAMPLE

A connector of the invention as illustrated in FIG. 1 was constructed to releasably connect a pair of optical fibers, each having a glass core-cladding 125 μm in diameter and a buffer 250 μm in diameter.

The mount 116 was ceramic and had a diameter across the minor axis of 0.1150 inches (0.292 cm), and a diameter across its major axis of 0.1295 inches (0.329 cm). The channel in the mount was a V-groove with an angle of 70°. The shallow section 122A of the groove was formed deeply enough so that a 125 μm gauge pin placed longitudinally in the groove protruded about 0.001 to 0.001 inches (0.0015 to 0.0051 cm) above the mount surface.

The central tube section 150 was #25 full hard BeCu alloy with a length of 0.650 inches (1.65 cm), an inside diameter of 0.1277 inches (0.324 cm), and a wall thickness of 0.005 inches (0.013 cm).

The connector body 110 was injection molded polyethersulfone (PES), and included first and second tube sections 140, 142 having a circular cross section, a diameter of 0.1280 inches (0.325 cm), and a wall thickness of 0.016 inches (0.041 cm).

A pair of flanges 132 extended upward 0.45 inches (1.14 cm) from the base 112 of the connector body, and provide compressive force to differentially deform the central tube section and the first and second tube sections. Application of a squeezing force to the levers 134 causes a deflection of about 0.004 inches (0.010 cm) on each side of the central tube section 150 across the minor axis of the mount 116, and a deflection of about 0.0045 to about 0.005 inches (0.011 to 0.013 cm) in the first and second tube sections 140, 142.

The mean insertion loss at 1300 nm was −0.07 dB, which is well within the Bellcore standard referenced above.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

What is claimed is:

1. A connector for releasably connecting a first optical fiber to a second optical fiber, the optical fibers each comprising a bare fiber and a buffer, the connector comprising:

a mount having a longitudinal channel, wherein the mount has a generally elliptical cross-section;

an elastically deformable housing adapted to receive the mount, wherein the housing has a generally circular cross-section when undeformed and a generally elliptical cross-section when deformed, the housing comprising:

a first region which, when elastically deformed, opens to permit insertion of the bare fibers into the channel or removal of the bare fibers from the channel, and when undeformed retains the bare fibers in the channel in axially abutting relation, and a second region, which when elastically deformed opens to permit insertion of the optical fiber buffers into the channel or removal of the optical fiber buffers from the channel, and when undeformed retains the buffers in the channel; and means for selectively deforming the first and second regions.

2. A connector as claimed in claim 1, wherein the first region of the housing is made of a metal and the second region of the housing is made of a polymer.

3. A connector as claimed in claim 1, wherein the channel in the mount is a surface channel comprising a groove with a deep portion adapted to receive the optical fiber buffers and a shallow portion adapted to receive the bare fibers.

4. A connector as claimed in claim 1, wherein the housing comprises an elongate base, and wherein the second region of the housing comprises a first tube section affixed to a first end of the base, and a second tube section, separate from the first tube section, affixed to a second end of the base opposite the first end.

5. A connector as claimed in claim 4, wherein the first region of the housing comprises a central tube section positioned between the first and second tube sections.

6. A connector as claimed in claim 5, wherein the central tube section is a metal tube.

7. A connector as claimed in claim 6, wherein the metal tube is made of an alloy selected from the group consisting of beryllium copper, stainless steel, nickel and brass.

8. A connector as claimed in claim 7, wherein the alloy is beryllium copper.

9. A connector as claimed in claim 5, wherein the means for selectively deforming comprise levers attached to the base and acting generally at a diameter of the first and second tube sections.

10. A connector as claimed in claim 4, wherein the first and second tube sections are made of a polymer selected from the group consisting of polyetherimide, polyethersulfone, and polyarylsulfone.

11. A connector as claimed in claim 1, wherein the means for selectively deforming comprise levers acting on the first and second regions of the housing.

12. A connector for releasably connecting a first optical fiber to a second optical fiber, the optical fibers each comprising a bare fiber and a buffer, the connector comprising:

an elongate mount, wherein the mount has a generally elliptical cross-section and a longitudinal surface channel;

a deformable housing adapted to receive the mount, wherein the housing has a generally circular cross-section when undeformed, the housing comprising:

an elongate base, a first tube section attached to a first end of the base and a second tube section, separate from the first tube section, attached to a second end of the base, wherein the first and second tube sections are made of a first material which may be elastically deformed to permit insertion of the optical fiber buffers into the channel or removal of the optical fiber buffers from the channel, and when undeformed compressively retains the buffers in the channel, a central tube section positioned between the first and second tube sections, wherein the central tube section is made of a second material which may be elastically deformed to permit insertion of the bare fibers into the channel or removal of the bare fibers from the channel, and when undeformed compressively retains the bare fibers in the channel in axially abutting relation, and opposed lateral flanges attached to the base and the first and second tube sections and extending upward generally perpendicular to a plane of the base;

wherein a compressive force applied to the flanges in a plane parallel to the plane of the base deforms the first and second tube sections and the central tube section.

13. A connector as claimed in claim 12, wherein the mount is a unitary structure, and wherein the channel in the mount is a groove having a first end and a second end, the groove comprising first and second opposed deep portions at the first and second ends, respectively, of the mount, and a shallow central portion between the first and second portions, and wherein, when the mount is inserted in the housing, the central portion lies beneath the central tube section of the housing and the first and second deep portions lie beneath the first and second deformable tube sections of the housing, respectively.

14. A connector as claimed in claim 12, wherein the mount is a three-piece structure comprising:

a central ceramic portion with a first and a second end, the central portion having a shallow surface groove;

opposed first and second chocks abutting the first and second end, respectively, of the central portion, wherein the first and second chocks have a deep surface groove, and wherein, when the mount is inserted in the housing, the central portion lies beneath the central tube section of the housing and the first and second chocks lie beneath the first and second deformable tube sections of the housing, respectively.

15. A connector as claimed in claim 14, wherein the chocks interlock with the central ceramic portion.

16. A connector as claimed in claim 12, wherein the second material is a metal.

17. A connector as claimed in claim 12, wherein the second material is an alloy selected from the group consisting of beryllium copper, stainless steel, nickel, and brass.

18. A connector as claimed in claim 12, wherein the first material is a polymer selected from the group consisting of polyetherimide, polyethersulfone, and polyarylsulfone.

19. A device for releasably connecting a first optical fiber to a second optical fiber, the optical fibers each comprising a bare end and buffer, the device comprising:

an elongate unitary mount with a generally elliptical cross-section and a longitudinal channel, wherein the channel in the mount is a V-groove having a first end and a second end, the groove comprising first and second opposed deep portions at the first and second ends, respectively, of the mount, and a shallow central portion between the first and second portions;

a connector body comprising a housing having an elongate base with an upper surface and a lower surface, a first deformable tube section integrally formed on the upper surface of the base and adjacent a first end thereof, a second deformable tube section, separate from the first deformable tube section, integrally formed on an upper surface of the base and adjacent a second end thereof distal the first end, wherein the first and second tube sections are made of a first material which may be elastically deformed to permit insertion of the optical fiber buffers between the housing and the mount and into the channel, and when undeformed compressively retain the fiber buffers in the channel and a deformable, central tube section, wherein the central tube section is made of a second material which may be elastically deformed to permit insertion of the bare fibers between the housing and the mount and into the channel, and when undeformed compressively retains the bare fibers in the channel in axially abutting relation;

a first pair of opposed lateral flanges attached to the base and contacting the first deformable tube section generally at a diameter thereof, a second pair of opposed lateral flanges attached to the base and contacting the second deformable tube section generally at a diameter thereof, wherein the flanges extend upward generally perpendicular to a plane of the base portion;

wherein the central tube section is retained in the connector body between the first and second pairs of flanges, the mount is positioned inside the central tube section and extends into the first and second deformable tube sections, and wherein the central portion of the mount lies beneath the central tube section of the housing and the first and second deep portions lie beneath the first and second deformable tube sections of the housing, respectively.

20. A device as claimed in claim 19, wherein the first and second pairs of flanges are each divided centrally to form a pair of second class levers, and wherein each of the levers further comprise depressions on a side thereof opposite the first and second deformable tube sections, and wherein the depressions are shaped to engage an operator's fingers.

21. A device as claimed in claim 19, wherein the central tube section is a metal tube, wherein the second material is selected from the group consisting of beryllium copper, stainless steel, nickel, and brass.

22. A device as claimed in claim 19, wherein the first material is a polymer selected from the group consisting of polyetherimide, polyethersulfone, and polyarylsulfone.

23. A device as claimed in claim 19, wherein the first and second pairs of flanges further comprise projections to retain the central tube section.

24. A device as claimed in claim 19, wherein the base further comprises an undercut cavity to retain the central tube section.

25. A connector as claimed in claim 19, wherein the mount is a three-piece structure comprising:

a central ceramic portion with a first and a second end, the central portion having a shallow surface groove; and opposed first and second resinous portions abutting the first and second end, respectively, of the central portion, wherein the first and second portions have a deep surface groove, and wherein, when the mount is inserted in the housing, the central portion lies beneath the central tube section of the housing and the first and second portions lie beneath the first and second tube sections of the housing, respectively.

26. An apparatus for connecting two optical fibers, each with a bare fiber and a buffer, comprising a base having two deformable tubular regions attached thereto, the tubular regions being made of an elastically deformable polymer, an elastically deformable metal tube between the tubular regions, and a grooved elliptical mount emplaced inside the tube and the tubular regions, wherein the metal tube and the polymeric tubular regions in an undeformed state compressively retain the bare ends and the buffers of the fibers, respectively, in the groove of the mount, and wherein the tube and the tubular regions in an elastically deformed state open sufficiently to permit insertion into the groove, or removal from the groove, of the bare ends and the buffers of the fibers, respectively, and means for selectively deforming the tube and the tubular regions to receive or remove the bare ends and the buffers of the fibers, respectively, from the groove.

27. An apparatus as claimed in claim 26, wherein the means for selectively deforming is a tool.

28. An apparatus as claimed in claim 26, wherein the means for deforming comprise levers integrally molded with the base.

29. A method for connecting two optical fibers enclosed within protective buffers, comprising the steps of:

providing a mount with a longitudinal groove;

inserting the mount in an elastically deformable tubular housing having a generally circular cross-section when unreformed, wherein the housing comprises:

a first and second tube section made of a first material which may be elastically deformed to permit insertion of the buffers between the housing and the mount and into the groove, or removal of the buffers from the groove, and when undeformed compressively retain the fiber buffers in the groove, and a central tube section between the first and second tube sections, wherein the central tube section is made of a second material which may be elastically deformed to permit insertion of the bare fibers between the housing and the mount and into the groove, or removal of the bare fibers from the groove, and when undeformed compressively retains the bare fibers in the groove in axially abutting relation;

sequentially elastically deforming the first/second tube sections and central tube section;

inserting the optical fibers into the groove in the mount, wherein the fibers lie between the central tube section and the mount, and the buffers lie between the first and second tube sections, respectively, and the mount; and returning the tubular housing to an undeformed state, whereby the fibers and buffers are compressively urged against the groove in the mount.

30. A method as claimed in claim 29, wherein the first material is a polymer and the second material is a metal.

31. A method as claimed in claim 30, wherein the polymer is polyethersulfone and the metal is a beryllium copper alloy.

* * * * *